(12) United States Patent
Ruffin

(10) Patent No.: US 7,182,496 B2
(45) Date of Patent: Feb. 27, 2007

(54) MULTIPLE LED FOCUSED LIGHTING DEVICE

(75) Inventor: Marvin Ruffin, Chicago, IL (US)

(73) Assignee: Opto Technology, Inc., Wheeling, IL (US)

( * ) Notice: Subject to any disclaimer, the term of this patent is extended or adjusted under 35 U.S.C. 154(b) by 70 days.

(21) Appl. No.: 10/824,277

(22) Filed: Apr. 14, 2004

(65) Prior Publication Data

US 2005/0231974 A1 Oct. 20, 2005

(51) Int. Cl.
F21V 7/04 (2006.01)

(52) U.S. Cl. .................................................... 362/555

(58) Field of Classification Search ............... 362/554, 362/555, 556, 582, 231, 235, 237, 341, 248
See application file for complete search history.

(56) References Cited

U.S. PATENT DOCUMENTS

| | | | |
|---|---|---|---|
| 2,645,705 A | 7/1953 | Rutledge | |
| 3,932,761 A | 1/1976 | Ramsey et al. | 250/552 |
| 4,521,835 A | 6/1985 | Meggs et al. | |
| 4,824,201 A | 4/1989 | Kazovsky | 398/185 |
| 4,943,128 A | 7/1990 | Takada et al. | |
| 4,964,692 A * | 10/1990 | Prescott | 385/117 |
| 5,276,600 A * | 1/1994 | Takase et al. | 362/320 |
| 5,303,125 A * | 4/1994 | Miller | 362/554 |
| 5,345,531 A * | 9/1994 | Keplinger et al. | 385/102 |
| 5,548,676 A | 8/1996 | Savage, Jr. | 385/92 |
| 5,732,176 A | 3/1998 | Savage, Jr. | 385/92 |
| 5,782,555 A | 7/1998 | Hochstein | 362/373 |
| 5,806,955 A | 9/1998 | Parkyn, Jr. et al. | 362/31 |
| 6,120,164 A * | 9/2000 | Libin et al. | 362/269 |
| 6,170,973 B1 | 1/2001 | Benedict | |
| 6,272,269 B1 | 8/2001 | Naum | 385/43 |
| 6,290,382 B1 * | 9/2001 | Bourn et al. | 362/554 |
| 6,328,484 B1 | 12/2001 | Uebbing | 385/93 |
| 6,443,594 B1 | 9/2002 | Marshall et al. | 362/244 |
| 6,473,554 B1 | 10/2002 | Pelka et al. | 385/146 |
| 6,529,318 B1 | 3/2003 | Kaneda et al. | 359/341.32 |
| 6,595,674 B1 | 7/2003 | Yoneda | 362/555 |
| 6,611,110 B1 | 8/2003 | Fregoso | 315/224 |
| 6,639,733 B2 | 10/2003 | Minano et al. | 359/728 |
| 6,652,158 B2 | 11/2003 | Bartur et al. | |
| 6,679,621 B2 | 1/2004 | West et al. | 362/327 |
| 6,796,698 B2 * | 9/2004 | Sommers et al. | 362/555 |

(Continued)

FOREIGN PATENT DOCUMENTS

JP 63078110 4/1988
WO WO 98/52078 11/1998

Primary Examiner—Renee Luebke
Assistant Examiner—Julie A. Shallenberger (57) ABSTRACT

A multiple LED based lighting device for commercial indoor or outdoor architectural applications is disclosed. The lighting device uses multiple LEDs which are arranged in a symmetrical array in order to combine their light output. The LEDs are supported in a fixed position and have a conical reflector to assist in focusing the light output. A heat sink is attached to the LEDs to allow for use of high power for greater light output. The multiple LEDs are mounted relative to an optic fiber which has a core and cladding material to retain light based on total internal reflection. The light output from the LEDs are cast on the optic fiber which may provide side lighting effects from the perimeter of the optic fiber or emit light from the opposite end of the optic fiber.

14 Claims, 8 Drawing Sheets

U.S. PATENT DOCUMENTS

| | | |
|---|---|---|
| 6,843,591 B1 * | 1/2005 | Peng et al. .................. 362/560 |
| 2002/0126503 A1 | 9/2002 | Reed ........................... 714/30 |
| 2003/0112639 A1 | 6/2003 | Stack .......................... 362/552 |
| 2003/0147254 A1 | 8/2003 | Yoneda et al. ............... 362/551 |
| 2003/0198061 A1 | 10/2003 | Chambers et al. .......... 362/555 |
| 2003/0219207 A1 | 11/2003 | Guy ............................. 385/49 |
| 2003/0235800 A1 | 12/2003 | Qadar ......................... 433/29 |
| 2004/0043351 A1 | 3/2004 | Logan ......................... 433/29 |
| 2004/0051482 A1 | 3/2004 | Fregoso ...................... 315/291 |
| 2004/0057251 A1 | 3/2004 | Isaacson et al. ............ 362/555 |

* cited by examiner

MULTIPLE LED FOCUSED LIGHTING DEVICE

FIELD OF INVENTION

The present invention relates generally to the field of light emitting diodes. More specifically, the present invention is directed to a lighting device that uses the light from multiple LEDs focused on an optic fiber in order to create high output lighting.

BACKGROUND OF INVENTION

Light emitting diodes (LEDs) are well known solid state light sources. LEDs have many advantages over traditional lighting sources such as incandescent bulbs as they are cheaper to produce, more robust, and require less power. LEDs are especially desirable as they emit light with high power efficiency over specific colors in the spectrum. However, LEDs are not a focused light source and suffer from relatively low light output. The lack of focused light and low light output prevents application of LEDs to uses where high light intensity is desired. Further LEDs cannot be fabricated in different shapes for decorative purposes. Finally, the light output of LEDs cannot be intensified without an optical device to focus the light.

There are many commercial applications requiring high light output. For example, there is a great demand for outdoor and indoor decorative or architectural lighting. Neon lighting is presently used for such applications. Neon or fluorescent lighting uses a glass tube which is filled with neon gas. Such devices may be used for lighting but also for advertising and signs as the tubes may be fabricated into different shapes. Such tubes may have different colors or generate simple white light. The light intensity of a neon tube depends on the color generated.

However neon lighting suffers from a number of problems. Neon lights require a relatively large amount of electricity to offer resulting in greater costs for heavy use such as outdoor signs. Also, neon lights require periodic replacement and maintenance because such lights experience a significant drop off in output after continual use. Further, the maximum length of a neon tube is around seven feet which necessitates more units for large scale uses. All of these factors may create cost issues. Also, neon lights require a high voltage transformer which may create safety issues. Finally, neon lights do not allow for easy change of the light color output.

Another solution for outdoor applications is high intensity discharge ("HID") lamps. HID lighting technology replaces the filament of the light bulb with a capsule of gas. The light is emitted from an arc discharge between two closely spaced electrodes hermetically sealed inside a small quartz glass tubular envelope capsule. To operate, they require ballasts, which supply proper voltage and control current. The amount of light produced is greater than a standard halogen bulb, while consuming less power, and more closely approximating the color temperature of natural daylight. Unfortunately, HID lighting has a short relative lifetime, requiring periodic replacement. Further, the HID lighting requires greater maintenance and repair.

Thus, there is a need for an LED based device which provides sufficient light intensity for high lighting applications. There is a further need for an LED based device which allows light output to be focused and directed. There is also a need for an LED based device which allows high light output from the end of an optic fiber. There is yet another need form an LED based device which allows bright side light effect. There is also a need for a low power, high reliability, lighting device suitable for commercial applications.

SUMMARY OF THE INVENTION

These needs and others may be met by the present invention, one example of which is a high output lighting device. The device has a support bracket having one end with a vertically extended arm and an opposing end with a lighting mounting bracket. An optic fiber having a receiving end and an emitting end supported by the vertically extended arm is provided. Multiple light emitting diodes are supported by the lighting mounting bracket and the multiple light emitting diodes are spaced at a fixed distance from the receiving end of the optic fiber and are angled to focus light output on the optic fiber.

Another example of the invention is a high output light emitting diode based lighting device. The lighting device has a support bracket having a flat bottom surface and two opposite first and second ends. A vertical support arm is attached to the first end of the support bracket. An optic fiber is attached to the vertical support arm, the optic fiber has a core material and a cladding material with a flat receiving end fixed in relation to the support bracket. A mounting arm is attached to the second end of the support bracket, the mounting arm includes multiple collars facing the receiving end of the optic fiber. A light emitting diode reflector assembly is attached to each of the multiple collars. The light emitting diode reflector assembly has a conical body having an open end mated with the collar, and an opposite closed end holding a light emitting diode.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF DRAWINGS

These and further aspects and advantages of the invention will be discussed more in detail hereinafter with reference to the disclosure of preferred embodiments, and in particular with reference to the appended Figures wherein.

DESCRIPTION OF THE PREFERRED EMBODIMENT

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Figure 1:
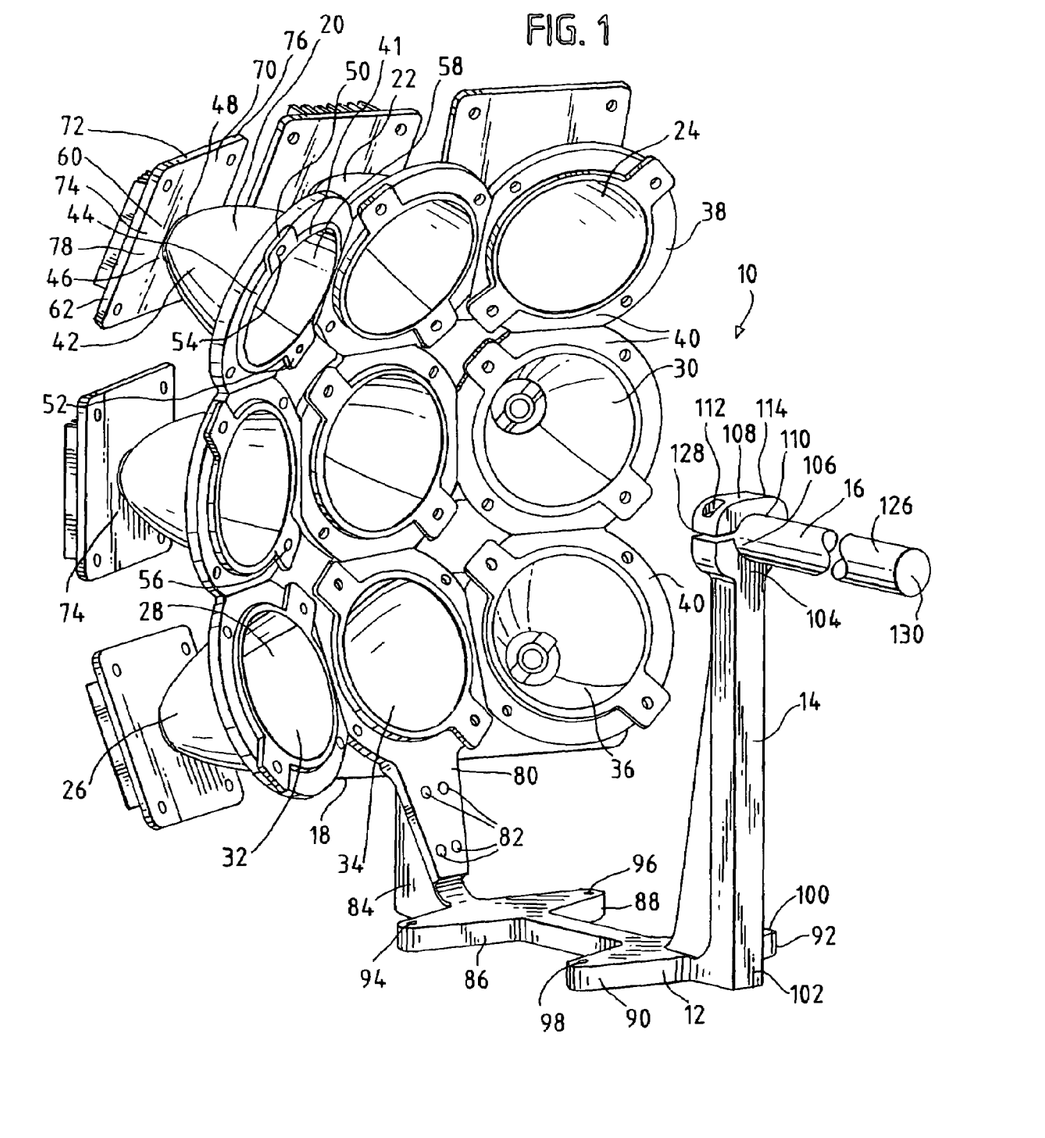
FIG. 1 is a perspective view of a lighting device with multiple LEDs according to one example of the present invention.
Figure 2:
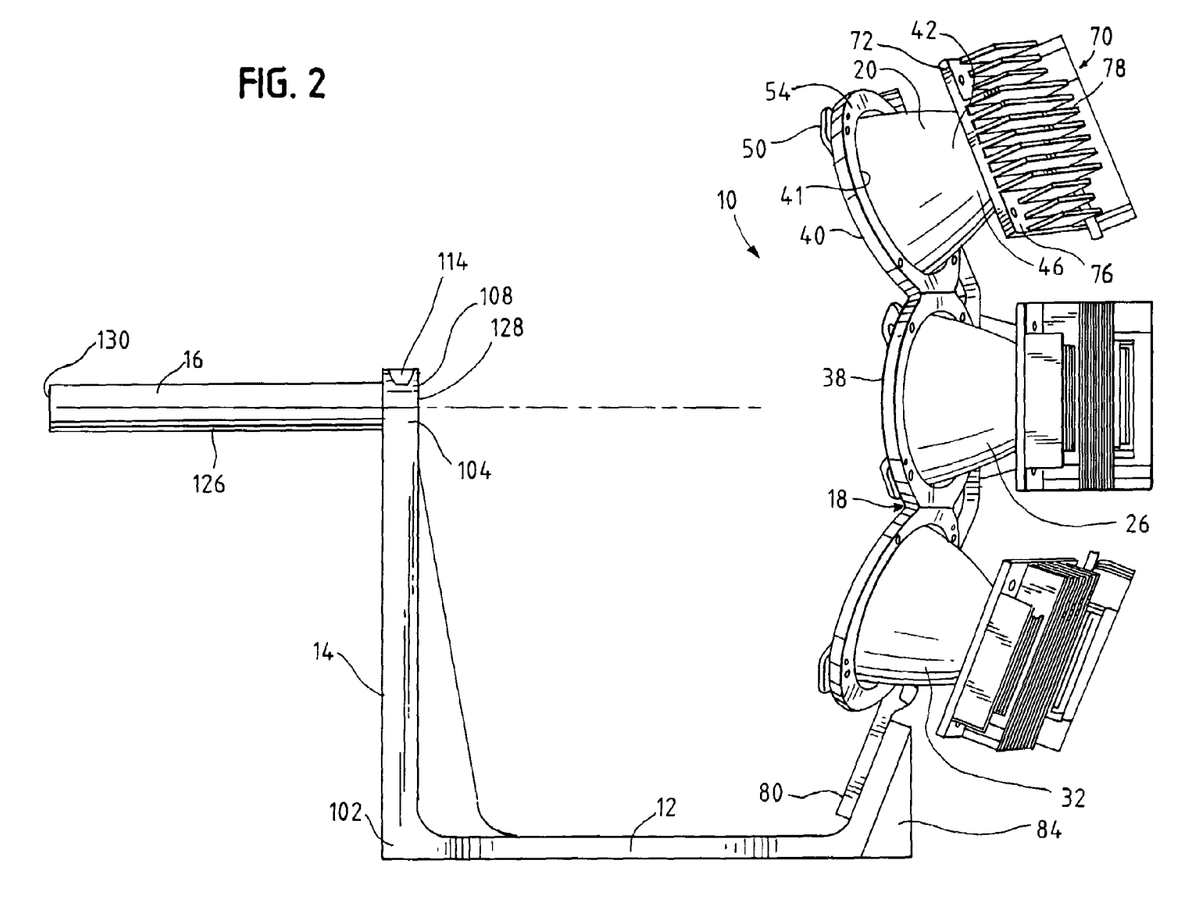
FIG. 2 is a side view of the support bracket holding the LEDs of the lighting device shown in FIG. 1.
Figure 3:
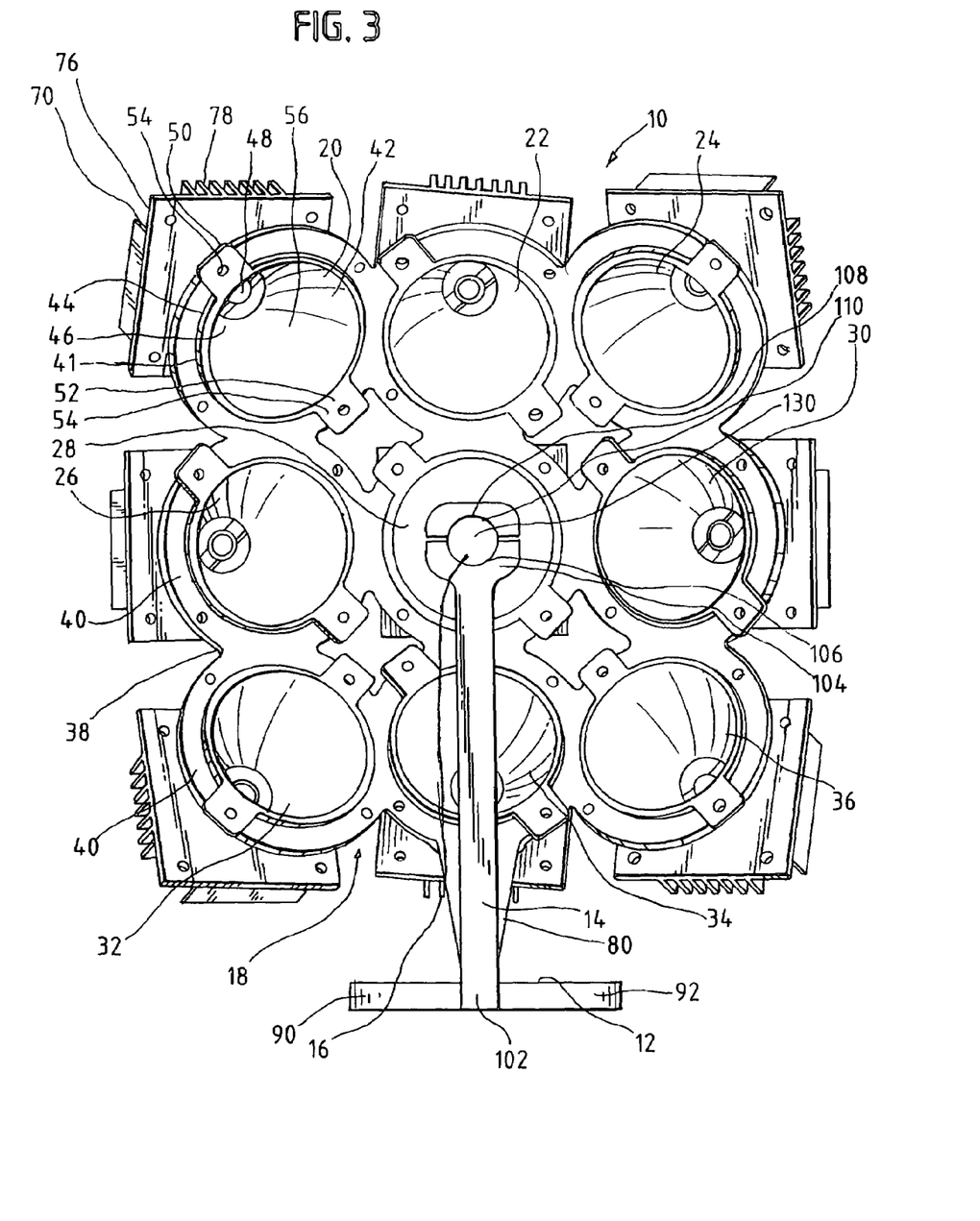
FIG. 3 is front view of the support bracket holding the LEDs of the lighting device shown in FIG. 1.
Figure 4:
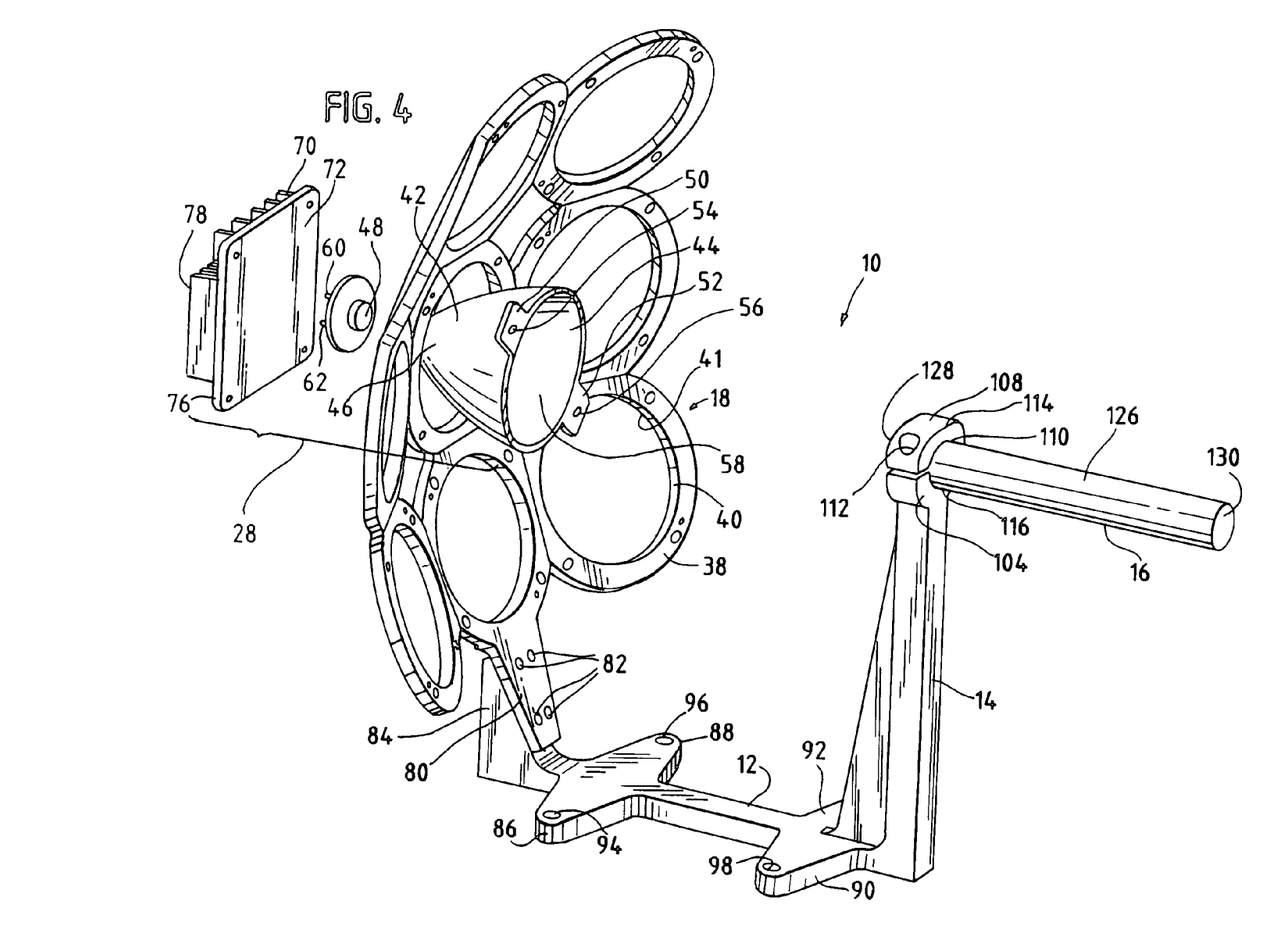
FIG. 4 is an exploded view of the lighting device with multiple LEDs shown in FIG. 1.

FIGS. 1–4 show a lighting device 10 that is one example of the present invention. FIG. 1 is a perspective view, FIG. 2 is a side view, FIG. 3 is a front view and FIG. 4 is an exploded view of the lighting device 10 which is a high output lighting device useable for indoor or outdoor architectural lighting.

The lighting device 10 has a support bracket 12 having a vertical arm 14 which supports an optic fiber 16. The optic fiber 16 is shown in FIGS. 1–4 as a linear rod shape. However, the optic fiber 16 may be formed or twisted in any variety of non-linear shapes. For example, the optic fiber 16 may be bent into the shape of a letter for a commercial application. In this example, the optic fiber 16 is manufactured by 3M, although other optic fibers which allow for side or end light effects may be used. The optic fiber 16 is preferably plastic to be flexible and resistant to fatigue, elongation and vibration. The optic fiber 16 has a core material which is preferably polymethacrylate and a cladding material which has a lower refractive index than the core material. When light enters the optic fiber 16, it is transported down the length of the fiber by total internal reflection between the core and cladding layers.

The support bracket 12 also includes an LED lighting support 18. The LED lighting support 18 suspends LED reflector assemblies 20, 22, 24, 26, 28, 30, 32, 34, 36 in a symmetrical pattern. The LED reflector assemblies 20–36 are essentially identical components. Each LED reflector assembly 20–36 is held in a fixed position by the LED lighting support 18 to focus light output on the optic fiber 16.

The LED support 18 includes a locking plate 38 which has a series of locking collars 40 each having a circular aperture 41. The LED reflector assemblies 20–36 are inserted in the locking collars 40 through the circular apertures 41. Each collar 40 is set at an angle on the plate 38 and a certain distance relative to the optic fiber 16 in order to focus light on the optic fiber 16.

The LED reflector assembly 20 has a conical body 42 having an open front end 44 and a closed back end 46 holding a light emitting diode 48. It is to be understood that the other LED reflector assemblies 22–36 are identical to the LED reflector assembly 20 and operate in the same manner. The open front end 44 of the conical body 42 has a pair of mounting tabs 50 and 52. The mounting tabs 50 and 52 have mounting holes 54 and 56 which are used in conjunction with fastening devices such as a rivet or a screw to fix the conical body 42 in place relative to the collar 40 of the locking plate 38.

The conical body 42 has a reflective interior surface 58 which is preferably coated with evaporated aluminum. The reflective interior surface 58 of the conical body 42 focuses the light emitted from the light emitting diode (LED) 48. The LED 48 is any semi-conductor, solid state light source. In the preferred embodiment, the LED 48 is a Luxeon light emitting diode since it offers a lower thermal resistance. The LED 48 is mounted on the closed end 46 of the conical reflector 42 and may be coupled to a power source (not shown) via two electrical pins 60 and 62. The closed end 46 of the conical reflector 42 is connected to a heat sink 70 which serves to dissipate the heat generated by the LED 48. The heat sink 70 allows for the use of higher power and thus higher light intensity output LEDs.

The heat sink 70 includes a flat plate 72 which has a mounting collar 74 which is attached to the back end 46 of the conical reflector 42. The flat plate 72 has a back surface 76 which has a series of protruding, vertical vanes 78 to assist in dissipation of heat. The heat sink 70 is typically made from a highly thermally conductive material such as die cast aluminum alloy to conduct and dissipate heat generated from the LED 48. Of course other thermally conductive materials such as copper or thermally conductive plastic may be used to fabricate the heat sink 70. It is to be understood that rather than having separate heat sinks such as heat sink 70 for each of the LED reflector assemblies 20–36, a single heat sink could be thermally coupled to all of the LEDs 48 in the reflector assemblies 20–36.

The components of the LED reflector assembly 20 may be better viewed with reference to LED reflector assembly 28 shown in exploded view in FIG. 4. The LED reflector 28 has identical element numbers as those assigned to LED reflector assembly 20 shown in FIGS. 1–3.

The LED support 18 has a tongue 80 which has a series of mounting holes 82. The tongue 80 is joined to a triangular vertical arm 84 extending from the support bracket 12 via rivets or screws that are installed in the mounting holes 82. The support bracket 12 also has a series of four feet 86, 88, 90 and 92 which extend outward and provide a flat surface to mount the support bracket 12 on a flat surface. Each of the feet 86–92 has a hole 94, 96, 98 and 100 respectively. The feet 86–92 may be bolted to a surface for mounting the lighting device 10 via the holes 94–100.

The vertical arm 14 holds the optic fiber 16 at a fixed distance from the LED support 18. The vertical arm 14 has a base 102 which is fixed to the surface plane of the support bracket 12. The vertical arm 14 also has a mounting cradle 104 opposite the base 102. The mounting cradle 104 has a channel 106 having a semi-circular shape to accommodate the optic fiber 16. A locking bar 108 has an opposite semi-circular channel 110 to hold the optic fiber 16 in place. The locking bar 108 has two slots 112 and 114 which accommodate screws to hold the locking bar 108 on the mounting cradle 104.

The optic fiber 16 has a body 126 and a receiving end 128 which receives the light from the LEDs mounted in the LED reflectors 20–36 and an emitting end 130. The optic fiber 16 allows end light emission from the emitting end 130 or side light effect from the perimeter of the body 126.

Figure 5:
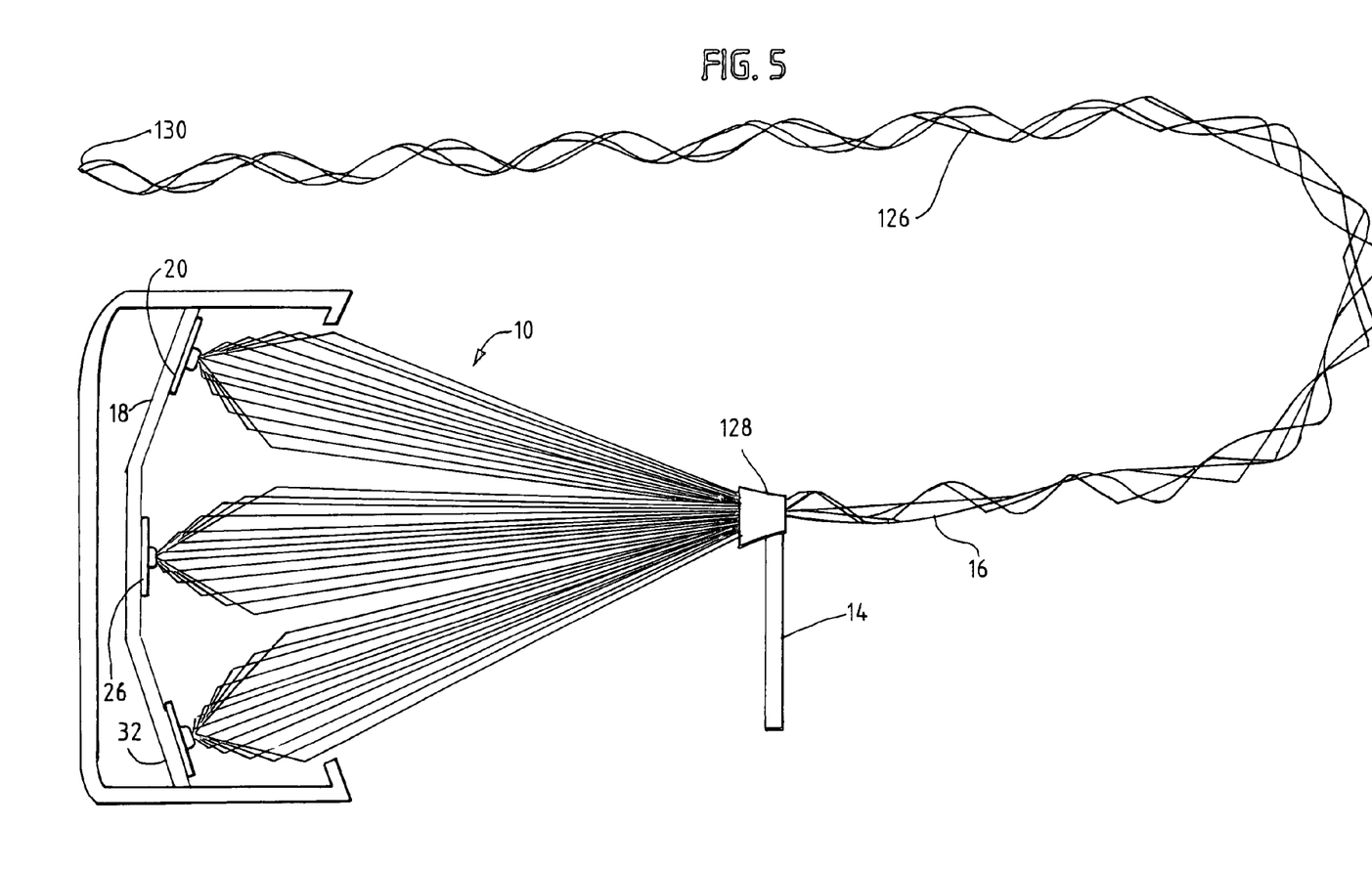
FIG. 5 is a cutaway view of the lighting device in FIG. 1 showing the path of the light rays emitted by the LEDs for a side light effect.

As shown in FIG. 5, light from the LEDs 48 in the LED reflector assemblies 20–36 may be directed toward the receiving end 108 and channeled through the body 126 of the optic fiber 16 for a bright side light effect. The LED reflector assemblies 20–36 are angled in order to maximize the amount of light output from the LEDs 48 transmitted to the optic fiber 16. In addition, the conical body 42 is shaped such that the reflective surface 58 reflects incident light from the LEDs 48 to the optic fiber 16. The basic shape of the conical body 42 is an ellipse according to the equation of $x^2/A + y^2/B = 1$. The ellipse shape has two foci which enables light collection. The reflector 20 may also be a compound elliptical concentrator that also has two foci.

The combined light from the nine LEDs 48 allows sufficient intensity light output from the optic fiber 16 for different applications. In this case, the cladding material of the optic fiber 16 is translucent. When the light from the LEDs 48 is focused on receiving end 128, it is scattered at the core/cladding interface and leaves the body 126 along the perimeter of the optic fiber 16. The light emission appears visually uniform along the length of the optic fiber 16. Since the light is directed by the optic fiber 16, any shape may be formed by the body 126 and corresponding light will be emitted throughout the body 126.

Figure 6:
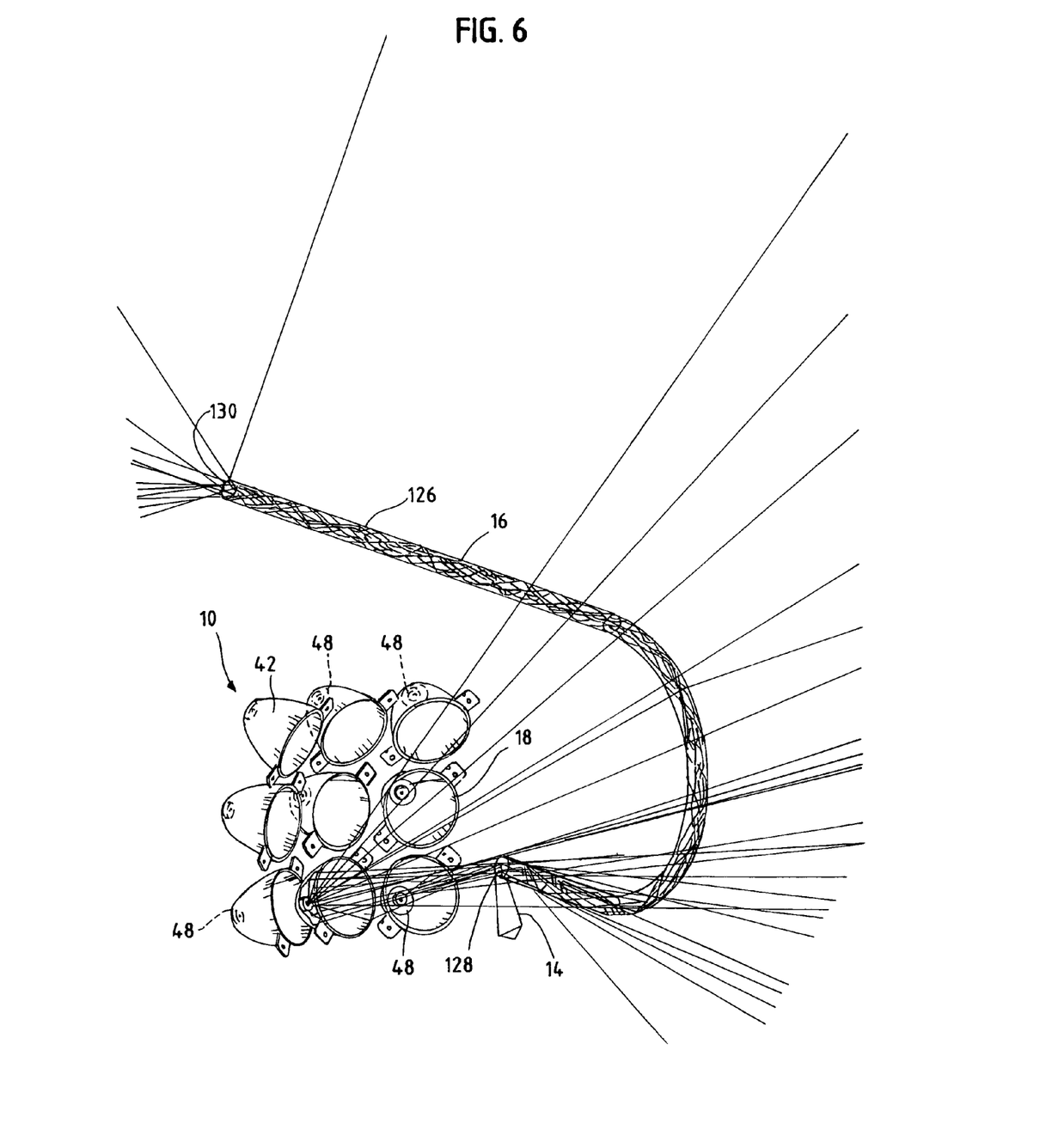
FIG. 6 is a view of the lighting device in FIG. 1 showing the path of light rays emitted by the optic fiber for an end light effect.

As shown in FIG. 6, light from the LEDs 48 may also be directed from the emitting end 130 of the optic fiber 16. In this instance, a black jacket covers the cladding of the fiber and channels the light out of the emitting end 130. This embodiment may be used for remote light applications like microscope lighting, endoscope lighting and machine vision. As described above, the lighting device 10 allows all of light emitted by the LEDs 48 to be focused on the optic fiber 16 for a combined high light output.

Figure 7:
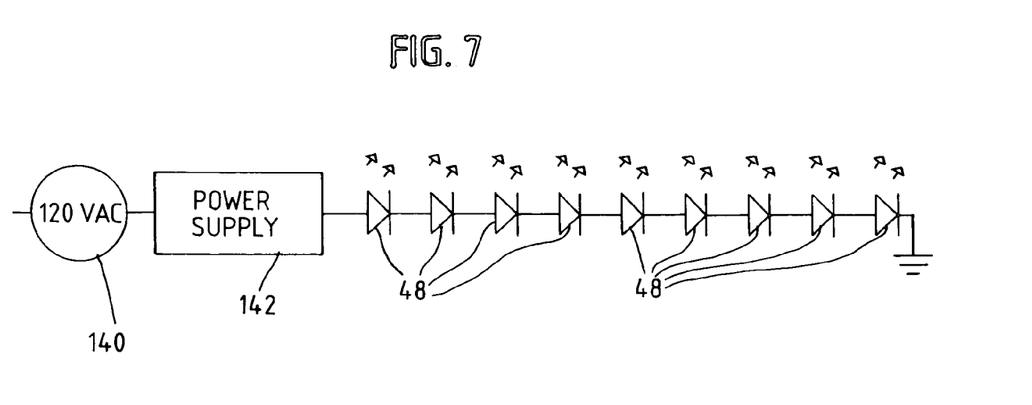
FIG. 7 is a circuit diagram of the lighting device in FIG. 1.

FIG. 7 is a circuit diagram of the electrical control for the LEDs 48 in the lighting device 10. The circuit diagram includes a power source 140 which is a typical AC power source. The power source 140 is coupled to a power supply 142 which transforms the AC power from the power source 140 to a DC voltage. The power supply 142 supplies a sufficient voltage supply for the LEDs 48 which in this example are the same color.

Figure 8:
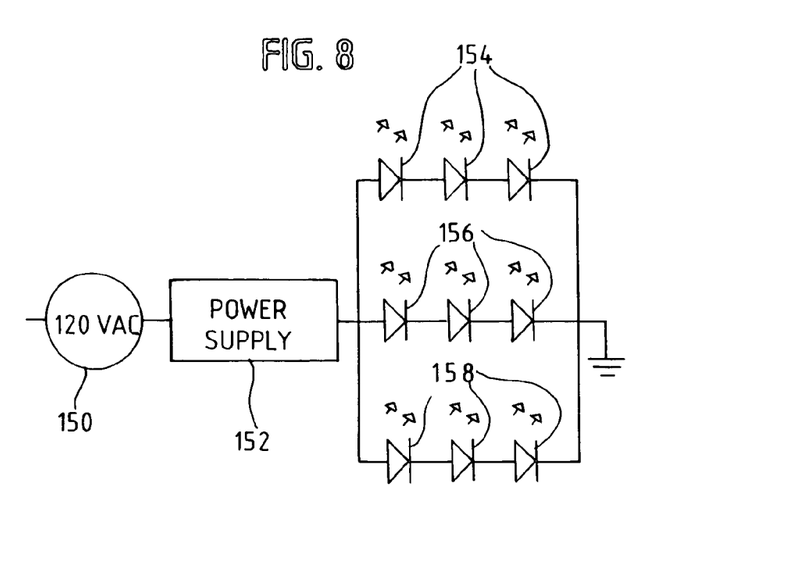
FIG. 8 is an alternate circuit diagram for the lighting device in FIG. 1 used for different color output.

Different colors may be used by changing the color of the exterior of the optic fiber 16. Different colors may also be generated by providing different color LEDs. Additionally, other colors may be generated by having several different color LEDs and using the combination of the different colors to generate another color. For example, the LEDs in the lighting device 10 may be wired according to the circuit shown in FIG. 8. FIG. 8 shows a power supply 150 which is coupled to a power source 152. The power source 152 is coupled to a red set of LEDs 154, a green set of LEDs 156 and a blue set of LEDs 158. The combination of the sets of LEDs 154, 156 and 158 maybe used to generate different colors by varying the current to the LED outputs.

Figure 9:
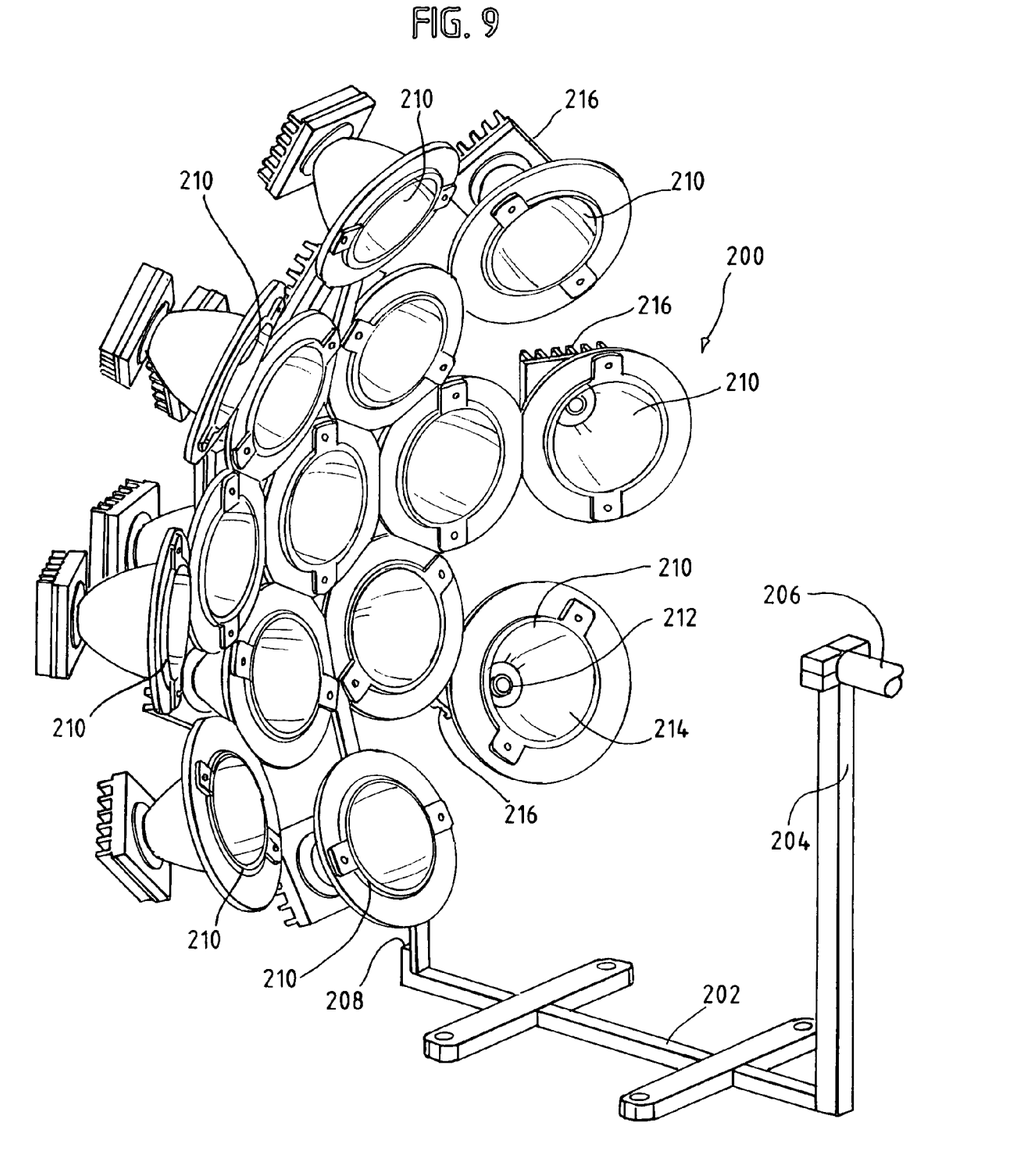
FIG. 9 is a perspective view of an alternate embodiment of the present invention using a different number of LEDs.

FIG. 9 shows a perspective view of a second alternate embodiment of a lighting device 200. The lighting device 200 has a support bracket 202 which has one end holding an optic support arm 204 which holds an optic fiber 206. The opposite end of the mounting bracket 202 includes an LED support arm 208. The LED support arm 208 holds a series of fifteen LED reflector assemblies 210 which all contain light emitting diodes 212. The LED assemblies 210 each have a conical reflecting surface 214 which focus light emitted by the LED 212 to the focal point of the optic fiber 206. The LED 212 is also coupled to a heat sink 216 to dissipate heat generated by the LED 212.

Similar to the previous example, light from the LEDs 212 are all focused by the angle of the respective LED reflectors 210 and the reflecting surfaces 214 to the optic fiber 206. The light of all of the fifteen LEDs 212 are thus captured by the optic fiber 206 and emitted over the length of the optic fiber.

The lighting device 200 has fifteen LEDs which generate greater amounts of light than the nine LEDs in the lighting device described in FIG. 1. It is to be understood that different numbers of LEDs may be used in order to vary the intensity of the output. Additionally, light intensity may be varied by selectively powering certain LEDs in the array.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A high output light emitting diode based lighting device, comprising:

a support bracket having a bottom surface and two opposite first and second ends;

a vertical support arm attached to the first end of the support bracket;

an optic fiber attached to the vertical support arm, the optic fiber having a core material and a surrounding cladding material with a receiving end fixed in relation to the support bracket;

a mounting arm attached to the second end of the support bracket, the mounting arm including multiple collars facing the receiving end of the optic fiber; and a light emitting diode reflector assembly attached to each of the multiple collars, the light emitting diode reflector assembly having a conical body having an open end mated with the collar, and an opposite closed end holding a light emitting diode.

2. The lighting device of claim 1 wherein the conical body has a reflective interior surface and is shaped to focus light output from the light emitting diode to the optic fiber end.

3. The lighting device of claim 2 wherein the reflective interior surface is evaporated aluminum.

4. The lighting device of claim 1 further comprising a heat sink thermally coupled to the light emitting diodes.

5. The lighting device of claim 1 wherein the light emitting diode assembly includes a heat sink having a plate with a top side coupled to the conical body and a bottom side having protruding vanes.

6. The lighting device of claim 1 wherein the optic fiber includes a black jacket and emits light from the emitting end of the optic fiber.

7. The lighting device of claim 1 wherein the cladding material is translucent allowing light to leave the optic fiber along the perimeter of the optic fiber.

8. The lighting device of claim 1 wherein the optic fiber is bent in a non-linear shape.

9. The lighting device of claim 1, wherein the multiple LEDs emit different colors producing a combined color from the optic fiber.

10. The lighting device of claim 1, wherein the multiple LEDs emit the same color light.

11. A high output light emitting diode based lighting device, comprising:

a base member having a bottom surface and two opposite first and second ends;

a vertical support attached to the first end of the base support;

an optic fiber attached to the vertical support, the optic fiber having a core material and a surrounding cladding material with a receiving end fixed in relation to the base member;

a mounting support attached to the second end of the support base, the mounting support including multiple collars facing the receiving end of the optic fiber; and a light emitting diode reflector assembly attached to each of the multiple collars, the light emitting diode reflector assembly having a conical body having an open end mated with the collar, and an opposite closed end holding a light emitting diode.

12. The lighting device of claim 11 wherein the conical body has a reflective interior surface and is shaped to focus light output from the light emitting diode to the optic fiber end.

13. The lighting device of claim 12 wherein the reflective interior surface is evaporated aluminum.

14. The lighting device of claim 11, wherein the multiple LEDs emit the same color light.

* * * * *